United States Patent

Wyner et al.

[11] Patent Number: 5,874,140
[45] Date of Patent: Feb. 23, 1999

[54] SHEET MATERIAL WITH ADHESIVE

[75] Inventors: Daniel M. Wyner, North Scituate, R.I.; Steven I. Wolkenbreit, Amherst; Jack Waksman, Easton, both of Mass.

[73] Assignee: R.H. Wyner Associates, Inc., West Bridgewater, Mass.

[21] Appl. No.: 963,308

[22] Filed: Nov. 3, 1997

Related U.S. Application Data

[63] Continuation of Ser. No. 743,392, Nov. 4, 1996, abandoned, which is a continuation of Ser. No. 229,685, Apr. 19, 1994, abandoned.

[51] Int. Cl.[6] .............................. B32B 1/08; B32B 7/10
[52] U.S. Cl. ................ 428/36.1; 428/36.5; 428/200; 428/349; 428/354
[58] Field of Search .................. 428/200, 343, 428/349, 351, 36.1, 36.5, 354

[56] References Cited

U.S. PATENT DOCUMENTS

| | | | |
|---|---|---|---|
| 2,321,996 | 6/1943 | Cohen et al. | 154/25 |
| 2,496,349 | 2/1950 | Kellgren et al. | 117/155 |
| 2,758,045 | 8/1956 | Heaton et al. | 154/46 |
| 2,776,451 | 1/1957 | Chavannes | 18/10 |
| 2,964,866 | 12/1960 | Chamberlin | 40/16 |
| 3,024,154 | 3/1962 | Singleton et al. | 156/209 |
| 3,141,913 | 7/1964 | Edwards | 264/210 |
| 3,170,974 | 2/1965 | Jacobs | 264/284 |
| 3,179,550 | 4/1965 | Friedman | 161/62 |
| 3,187,069 | 6/1965 | Pincus et al. | 264/45 |
| 3,258,511 | 6/1966 | McGregor, Jr. | 264/45 |
| 3,332,829 | 7/1967 | Avery | 161/33 |
| 3,346,105 | 10/1967 | Nye et al. | 206/59 |
| 3,393,106 | 7/1968 | Marrinan et al. | 156/232 |
| 3,434,861 | 3/1969 | Luc | 117/10 |
| 3,533,895 | 10/1970 | Norcross | 161/88 |
| 3,699,187 | 10/1972 | Gardziella | 156/332 |
| 3,848,037 | 11/1974 | Harper | 264/46.4 |
| 3,892,078 | 7/1975 | Closson, Jr. | 36/68 |
| 3,929,545 | 12/1975 | Van Dyck et al. | 156/220 |
| 3,930,923 | 1/1976 | Elliott | 156/244 |
| 4,091,142 | 5/1978 | Elmore et al. | 428/322 |
| 4,183,978 | 1/1980 | Hefele | 428/200 X |
| 4,370,374 | 1/1983 | Raabe et al. | 428/216 |
| 4,397,905 | 8/1983 | Dettmer et al. | 428/180 |
| 4,423,106 | 12/1983 | Mahn | 428/207 |
| 4,429,076 | 1/1984 | Saito et al. | 525/57 |
| 4,692,199 | 9/1987 | Kolzlowski et al. | 156/245 |
| 4,720,416 | 1/1988 | Duncan | 428/349 X |
| 4,732,800 | 3/1988 | Groshens | 428/200 X |
| 4,849,045 | 7/1989 | Schmidt | 156/244.24 |
| 4,871,407 | 10/1989 | Honma et al. | 156/83 |
| 4,871,506 | 10/1989 | Monlies et al. | 264/514 |
| 4,906,507 | 3/1990 | Grynaeus et al. | 428/349 X |
| 4,983,436 | 1/1991 | Bailey et al. | 428/40 |
| 5,004,635 | 4/1991 | Griebling | 428/33 |
| 5,108,814 | 4/1992 | Harp et al. | 428/156 |
| 5,154,956 | 10/1992 | Fradrich | 428/40 |
| 5,177,845 | 1/1993 | Meiller et al. | 29/91.1 |
| 5,292,476 | 3/1994 | Jones | 264/46.6 |

FOREIGN PATENT DOCUMENTS

| | | |
|---|---|---|
| 1219715 | 3/1987 | Canada. |
| 2011868 | 10/1990 | Canada. |

OTHER PUBLICATIONS

Killion Equipment & Services Catalog, Killion Extruders, Inc., Cedar Grove, New Jersey (no date).

*Primary Examiner*—James J. Bell
*Assistant Examiner*—Blaine R. Copenheaver
*Attorney, Agent, or Firm*—Fish & Richardson P.C.

[57] ABSTRACT

A two-layer material suitable for use as a barrier layer for a cushion sock in a foam-in-place process is formed by bonding a discontinuous adhesive layer to a pinhole-free, lubricant-free barrier layer. The discontinuous adhesive layer has a melting temperature higher than 180 degrees Fahrenheit. A foam cushion is molded adjacent the cushion sock by first attaching a barrier layer to the cushion sock, and vacuum drawing the cushion sock attached to the barrier layer over a mold. The cushion sock and the barrier layer are then heated to a temperature no higher than 400 degrees Fahrenheit to bond the cushion sock and the barrier layer together.

20 Claims, 13 Drawing Sheets

SHEET MATERIAL WITH ADHESIVE

This is a continuation of application Ser. No. 08/743,392, filed Nov. 4, 1996, now abandoned, which is a continuation of application Ser. No. 08/229,685, filed Apr. 19, 1994, now abandoned.

BACKGROUND

This invention relates to sheet materials with adhesives used in making, for example, covered foam products.

Automobile seat cushions and other foam products are typically produced by a foam-in-place process in which the seat cushion is chemically foamed against a finish fabric covering the seat. The process often begins by first laminating a lubricant-free urethane barrier layer to the finish fabric by, for example, flame lamination. A thin layer of foam placed between the fabric and the barrier layer acts as an adhesive bonding the fabric to the barrier. The resulting tri-layer fabric/foam/barrier composite is then cut and sewn into a sock cushion.

Often, the finished seat is sewn together from several different pieces of finish fabric and the seams of the sock cushion are sealed prior to foaming to prevent liquid components in the foaming process from bleeding through the finish fabrics and to assure a good vacuum barrier during the process of molding the foam cushion.

For ease of handling in cutting and sewing the composite, a slip sheet may be bonded to a surface of the barrier, e.g., a polyethylene sheet heat bonded to the barrier to provide a slippery surface that prevents the composite from catching under the presser foot of a sewing machine.

Use of a pin-hole free urethane film is also discussed in U.S. patent application Ser. No. 07/904,157, filed on Jun. 25, 1992, now abandoned.

SUMMARY OF THE INVENTION

In general, in one aspect, the invention features a material having a discontinuous adhesive layer attached to a pinhole-free, effectively lubricant-free barrier layer. The discontinuous adhesive layer has a melting temperature higher than 180 degrees Fahrenheit.

Embodiments of the invention may include the following features. The adhesive layer may be a web of adhesive filaments, a perforated layer of adhesive, or disconnected regions of adhesive distributed either randomly or in a pattern on the barrier layer, where the proportion of the surface area of the adhesive layer represented by adhesive is no more than 90%. The adhesive layer may be at least partially embedded in the pinhole-free barrier layer while a thickness of at least 0.0005 inches of the pinhole-free barrier layer remains unpenetrated by the adhesive layer. The adhesive layer may comprise a copolyamide with a melting temperature between 180 and 300 degrees Fahrenheit, while the pinhole-free barrier layer may comprise urethane. The adhesive layer may have a texture that is non-tacky.

In general, in another aspect, the invention features a material which also includes a second adhesive layer interposed between a substrate and the discontinuous layer on the pinhole-free barrier layer.

Embodiments of the invention may include the following features. The discontinuous adhesive layer may have the features recited above. The second adhesive layer may comprise an adhesive that easily bonds to the first adhesive layer. For example, the second adhesive layer may be identical to the first adhesive layer, or may comprise an adhesive that reacts chemically with an adhesive in the first adhesive layer. The second adhesive layer may also have a non-tacky texture.

In general, in another aspect, the invention features a cushion sock for use in making foam-in-place products, comprising two discrete patterns of a cover material having a non-tacky, discontinuous adhesive layer bonded to a surface of a cover material; the two discrete patterns are joined together along edges of the patterns with the adhesive layer exposed.

Embodiments of the invention may include the following features. The cover material may include a foam layer attached to a fabric layer with the adhesive layer bonded to a surface of the foam layer.

In general, in another aspect, the invention features a cover material comprising a foam layer attached to a surface of a fabric layer, with a non-tacky, discontinuous adhesive layer is attached to an exposed surface of the foam layer. In embodiments of the invention, the layers may include, among others the features recited above.

In general, in another aspect, the invention features a process for preparing a cushion sock by cutting patterns from a foam-backed cover material coated with a non-tacky, discontinuous adhesive and then assembling the patterns along the edges with the discontinuous adhesive exposed.

Embodiments of the invention may include the following features. The cover material may be produced by flame laminating a fabric to a surface of a foam layer and flame laminating the adhesive to an opposite surface of the foam layer. The adhesive layer may also be bonded to the foam layer by heat calendaring the adhesive layer to the foam layer, spraying a liquid adhesive on the foam layer, sputtering a melted adhesive onto the foam layer, or printing a melted adhesive onto the foam layer in a discontinuous pattern. The adhesive layer may be bonded to the foam layer either before or after the foam layer is laminated to the fabric. In addition, patterns from cover materials having different fabrics may be cut and sewn together to form the cushion sock.

In general, in another aspect, the invention features a process for molding a foam cushion adjacent a cushion sock by first placing a barrier layer over the cushion sock and then vacuum drawing the cushion sock and the barrier layer over a mold. The barrier layer having a discontinuous adhesive layer with a melting point above 180 degrees Fahrenheit. The cushion sock and the barrier layer are then heated to a temperature no higher than 400 degrees Fahrenheit to bond the cushion sock and the barrier layer together.

Embodiments of the invention may include the following features. The cushion sock and the barrier layer may be heated to a temperature no higher than 300 degrees Fahrenheit. The cushion sock may include patterns of different fabric joined together. A seamless barrier layer may be placed over the cushion sock by placing the adhesive layer on the barrier layer adjacent to a second adhesive layer on an inner surface of the cushion sock. The barrier layer and the cushion sock may be heated with a hot air gun.

In general, in another aspect, the invention features a process for making a two-layer material by bonding a discontinuous adhesive layer to a pinhole-free, lubricant-free barrier layer, the discontinuous layer having a melting temperature higher than 180 degrees Fahrenheit.

Embodiments of the invention may include the following features. The pinhole-free barrier layer may be extruded, and a pre-formed adhesive layer pressed against the pinhole-free barrier layer while the pinhole-free barrier layer is still warm from extrusion to bond the adhesive layer to the barrier layer. The pre-formed adhesive layer may also be pressed to the pinhole-free barrier layer while heating the pinhole-free barrier layer. Alternatively, the adhesive layer may be bonded by one of the methods recited above.

Advantages of the invention include the following.

The cover material may be cut and sewn into a cushion sock prior to attaching the barrier layer as an integral piece. The barrier layer thus has no seams to be sealed, even in cases where several pieces are sewn together to form the cushion sock. The seamless and pinhole free barrier layer also effectively seals the cover material to allow it to be vacuum drawn onto the foaming mold.

The barrier layer bonds destructively to the cover material in a very short time, allowing the seat cushions to be prepared efficiently for foaming. The resulting bond between the barrier layer and the cover material is hydrolitically stable, i.e., it remains destructively bonded to the cover material under exposure to high humidity and heat conditions, and after prolonged exposure to temperatures above 180 degrees Fahrenheit. The cover material and barrier layer thus together form a material which is useful for automobile seats.

The non-tacky adhesive layer prevents the barrier layer from clinging to itself during cutting and handling. The relatively rough texture of the adhesive layer allows one side of the barrier layer to be easily distinguished from the other.

A pre-existing discontinuous adhesive layer may be combined inexpensively with the lubricant free urethane layer in a single, low cost extrusion process. Alternatively, the discontinuous adhesive may be applied to the urethane in a variety of ways, including spraying a liquid adhesive onto the film, applying a hot melt adhesive in a pattern onto the film or extruding adhesive fibers onto the film.

The resulting discontinuous adhesive layer on the urethane has a large exposed surface area to volume ratio and a small heat mass. The discontinuous adhesive layer provides a severalfold increase in the thickness of the layer over a continuous adhesive layer of identical weight. Thus, a smaller amount of adhesive can be used to obtain the same power of adhesion provided by the continuous layer. These features allow the adhesive to be rapidly and evenly melted when heated and also to bond in a stable manner to the cover material.

The relatively low melting temperature of the adhesive layer also allows the adhesive to be easily melted and bonded to the cover material without requiring a large energy expenditure.

The pre-existing adhesive layer is made efficiently in a separate process before being bonded to the urethane. The barrier layer is thus formed in a highly cost effective manner by bonding a low weight of relatively inexpensive adhesive to the urethane layer in a single pass in the extrusion process.

By embedding the adhesive layer in the urethane layer, the resulting adhesive bond in the material displays a high hydrolytic stability.

The relatively rough, non-tacky adhesive layer that may be applied to the foam layer of the cover material prevents the cover material from catching during cutting and sewing, and thus replaces relatively expensive slip sheets that often bond with difficulty to the barrier layer. The adhesive layer on the foam also provides an additional bond to the barrier layer and allows the quantity of adhesive placed on the barrier layer to be greatly reduced (by the proportion of total adhesive on both the barrier and fabric layer applied to the fabric layer). By choosing an adhesive layer identical to or compatible with the adhesive layer on the barrier, a faster destructive bond using the same or less overall adhesive weight is achieved.

By providing an adhesive layer on both the fabric and the barrier, the temperature at which the fabric bonds to the barrier is also greatly reduced. This is because the adhesive bonds to itself at a temperature lower than the melt temperature of the adhesive. In addition, the adhesive layer on the barrier is already embedded in the urethane prior to bonding to the fabric, so that excessive heat to tightly bond the fabric to the urethane is not required.

The reduction in bonding temperature provided by the invention is particularly useful when the cover material comprises a delicate fabric, e.g. vinyl. The two adhesive layers are bonded together destructively at a low temperature without damaging the fabric layer in a manner that will survive subsequent heat aging tests.

Other features and advantages of the invention will become apparent from the following description and from the claims.

DESCRIPTION

Figure 1:
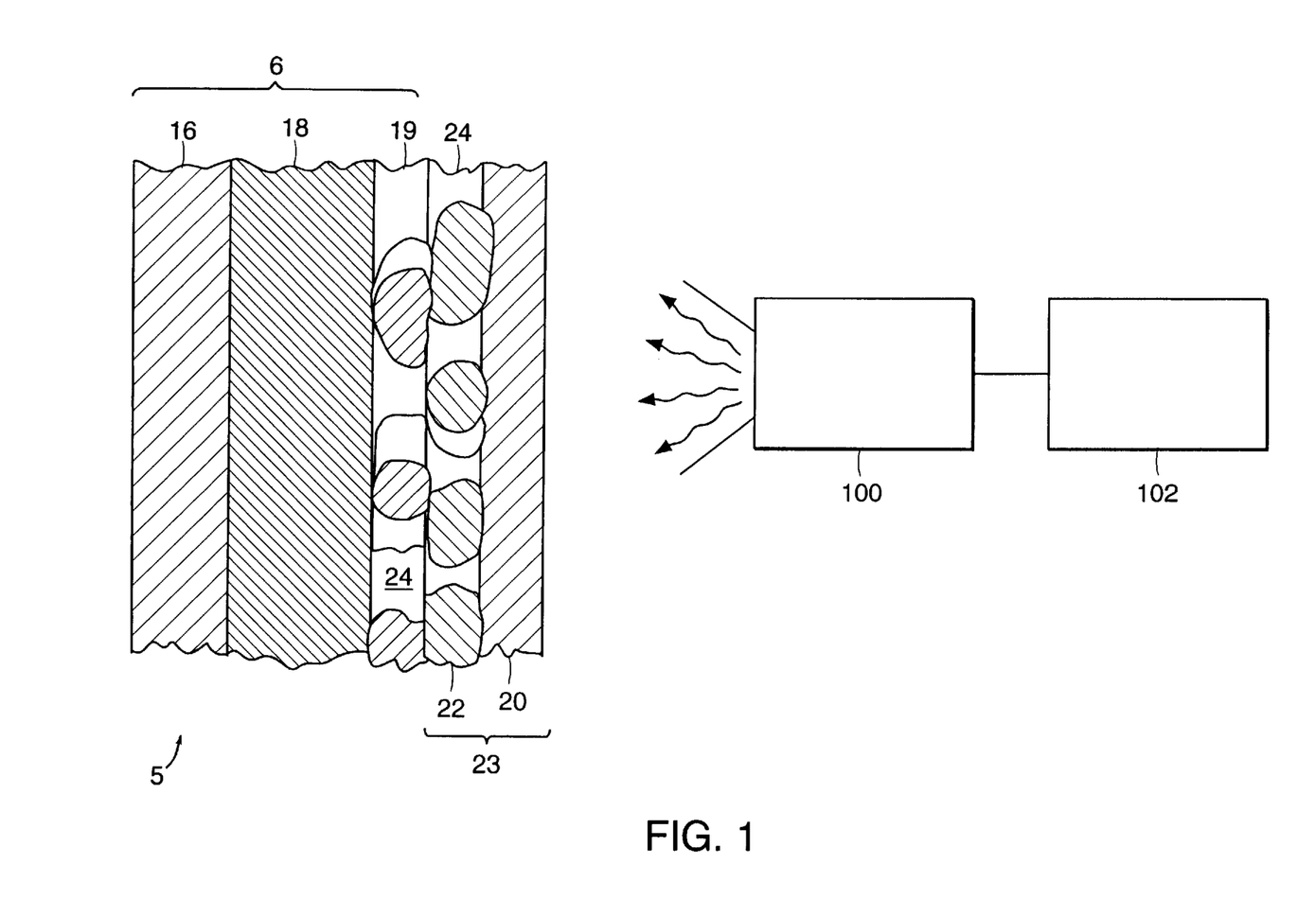
FIG. 1 is cross-sectional view of a multi-layered sheet material and a pictorial representation of a heater.

Referring to FIG. 1, a composite material 5 (not drawn to scale) may be used in making, for example, foam-in-place products such as covered automobile seat cushions. The material 5 has a cover material 6 having a finish fabric 16 bonded to a preformed foam layer 18. The foam layer is coated with a discontinuous, non-tacky adhesive layer 19. A urethane film 20 bonded to a second discontinuous, non-tacky adhesive layer 22 forms a barrier layer 23 of the material.

Urethane film 20 is substantially pin-hole free and thus provides an air-tight vacuum barrier and also a liquid foam chemical barrier during the foaming-in-place of a foam pad for the finished cushion. The urethane film is also lubricant-free to adhere chemically to liquid foaming agents used in the foaming process.

The discontinuous adhesive layers 19, 22 both have gaps or holes 24, i.e., regions without adhesive material. The gaps may be distributed either randomly or in a pattern across each adhesive layer 19, 22. The proportion of gaps to total surface area for the adhesive layer may be in the range of 10% to 90%, preferably 25% to 75%, most preferably about 40%.

Figure 2:
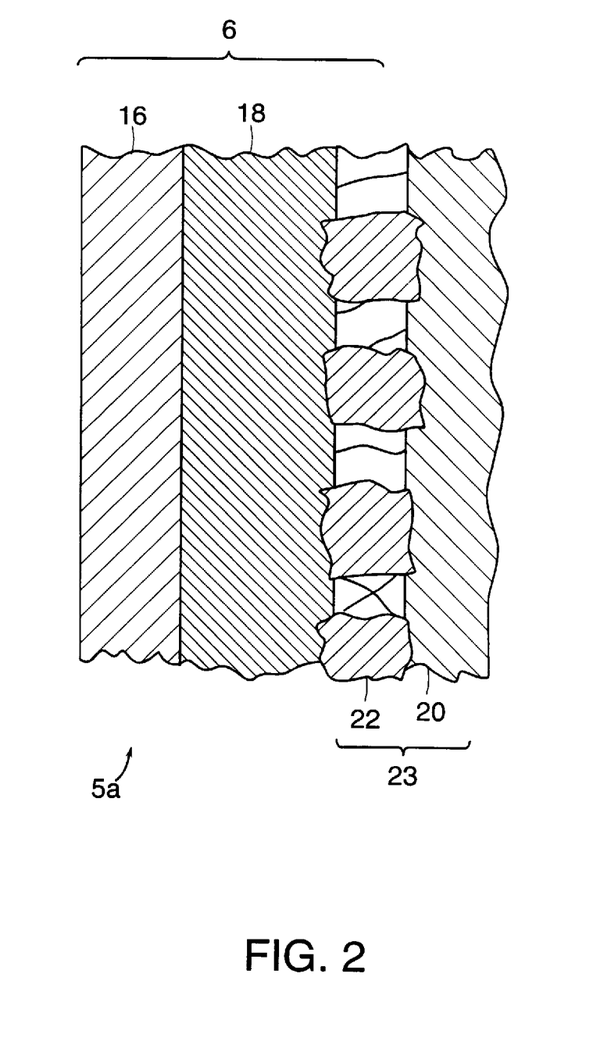
FIG. 2 is cross-sectional view of another multi-layered sheet material.

As seen in FIG. 2, an even less costly composite material 5a omits the adhesive layer 19 on the foam layer of the cover material 6. As seen in FIG. 2, the foam layer in material 5a is bonded to the barrier layer solely by the adhesive layer 22 on the urethane film 20. Material 5a is made by following the process described below for manufacturing the material 5 (FIG. 1) having two adhesive layers, but by omitting the step of adhering adhesive layer 19 to the foam layer 18 and instead increasing the amount of adhesive applied to the urethane film 20 approximately by the amount applied to the foam layer in manufacturing material 5.

Figure 3:
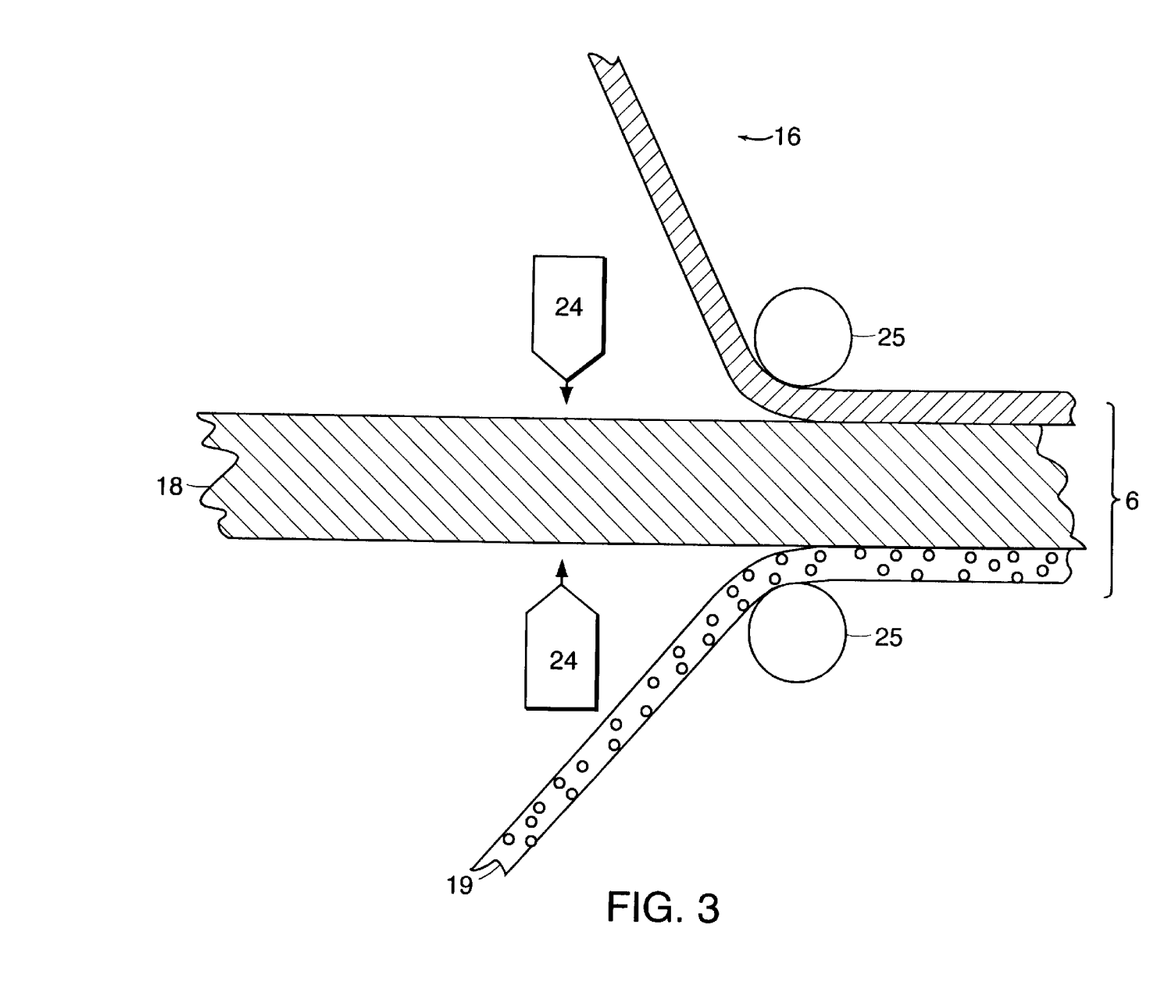
FIG. 3 is a cross-sectional view of a lamination process.

Referring to FIG. 3, the process begins by assembling the cover material 6 by heating a layer of foam 18 with a flame 24 before pressing a surface of the finish fabric 16 against the foam layer between two nip rolls 25. In the same step and at the same time, the opposite surface of the foam layer may be heated with another flame 24 before pressing a discontinuous adhesive layer 19 to the opposite surface between the nip rolls 25. The adhesive layer facilitates subsequent handling of the cover material, as described above. As an alternative to flame laminating the foam to the fabric, the foam can be bonded to the fabric using an adhesive before attaching the adhesive layer to the foam.

Figure 4:
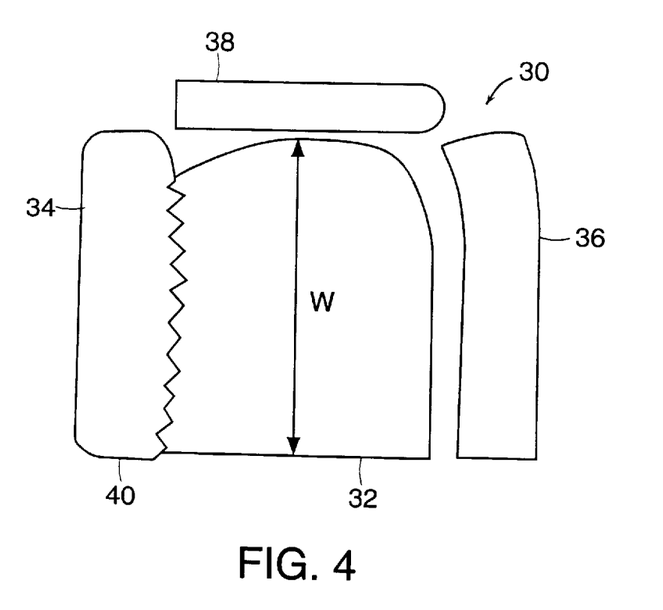
FIG. 4 is a plan view of patterns for making an automobile seat.
Figure 5:
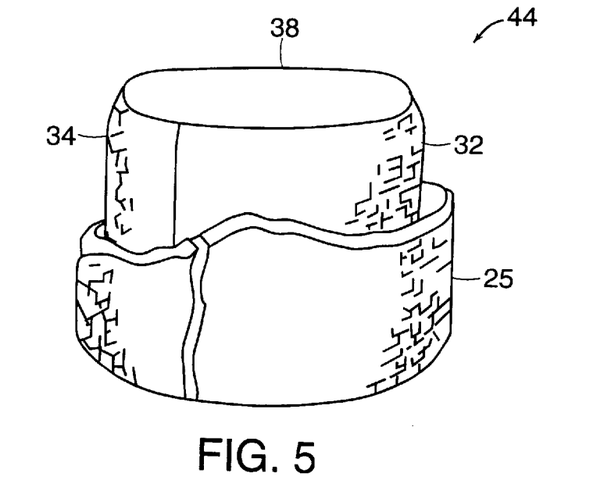
FIG. 5 is a perspective view of a shell of a seat cushion formed of the patterns of FIG. 4 and partially turned inside-out.

Pattern pieces 30 are then cut from a bolt of the finished cover material 6 as shown in FIG. 4. Pattern pieces 30 may include a front piece 32, side pieces 34 and 36, a top piece 38, and a rear piece (not shown). These pieces are sewn together with stitches 40 to form seat cushion shell 44. As shown in FIG. 5, shell 44 is then turned inside out, so that surface 25 bearing the adhesive layer 19 (FIG. 3) is exposed on the outside of the shell and the finish fabric is hidden on the inside of the shell.

Figure 6:
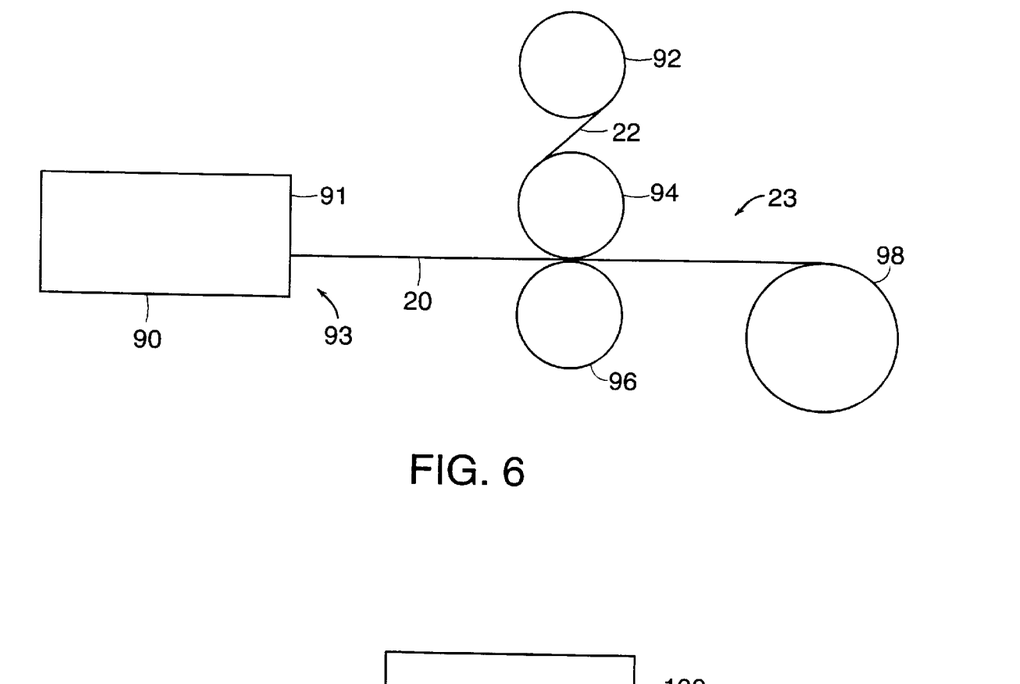
FIG. 6 is a pictorial representation of an extrusion process.

The barrier layer 23 (FIG. 1) of the material 5 is separately assembled by horizontal extrusion or vertical casting. Referring to FIG. 6, in the case of horizontal extrusion, extruder 90 melts urethane granules and forms urethane layer 20 by passing the molten urethane through a sheet die 91. The thickness of the urethane film is controlled by adjusting the speed of production or varying the die opening. In the sheet die, the urethane is at about 400° F. The pre-formed adhesive layer 22 is relatively cool and is fed from a roll 92.

A pre-formed adhesive layer 22 is embedded into the surface of the urethane film by laminating the adhesive to the urethane while the urethane is warmer than its softening point, i.e. while the urethane is still thermoplastic. This is accomplished by feeding the adhesive layer from roll 92 onto the urethane at or near the point of extrusion 93 of the urethane.

From a position that is near to the sheet die, the two layers are simultaneously pulled by a set of nip rolls, including, e.g., a rubber roll 94 and a steel roll 96. Rolls 94 and 96 press the two layers together while the urethane is still relatively warm. The resulting two-layer barrier layer 23 is trimmed at the edges and wound on take-up roll 98.

Figure 7:
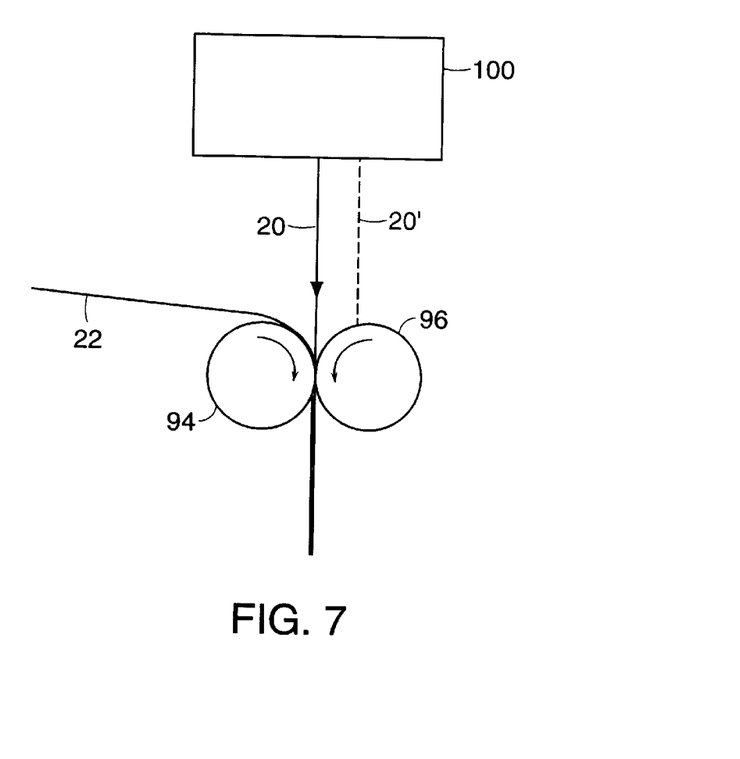
FIG. 7 is a pictorial representation of a casting process.

Referring to FIG. 7, alternatively, the barrier layer 12 may be produced from a casting die 100. Urethane film 20 is drawn vertically downward, and pressed to the adhesive layer 22 by rolls 94 and 96. The urethane film (shown at film 20') may also be directly extruded onto roll 96 prior to being pressed against the adhesive layer 22 between rolls 94 and 96. Alternatively, an air knife may be used to attach the adhesive to the film before the adhesive and film pass through the rolls. Other methods, for forming the discontinuous adhesive layer in real time rather than using a pre-existing adhesive layer, are discussed below.

Figure 8:
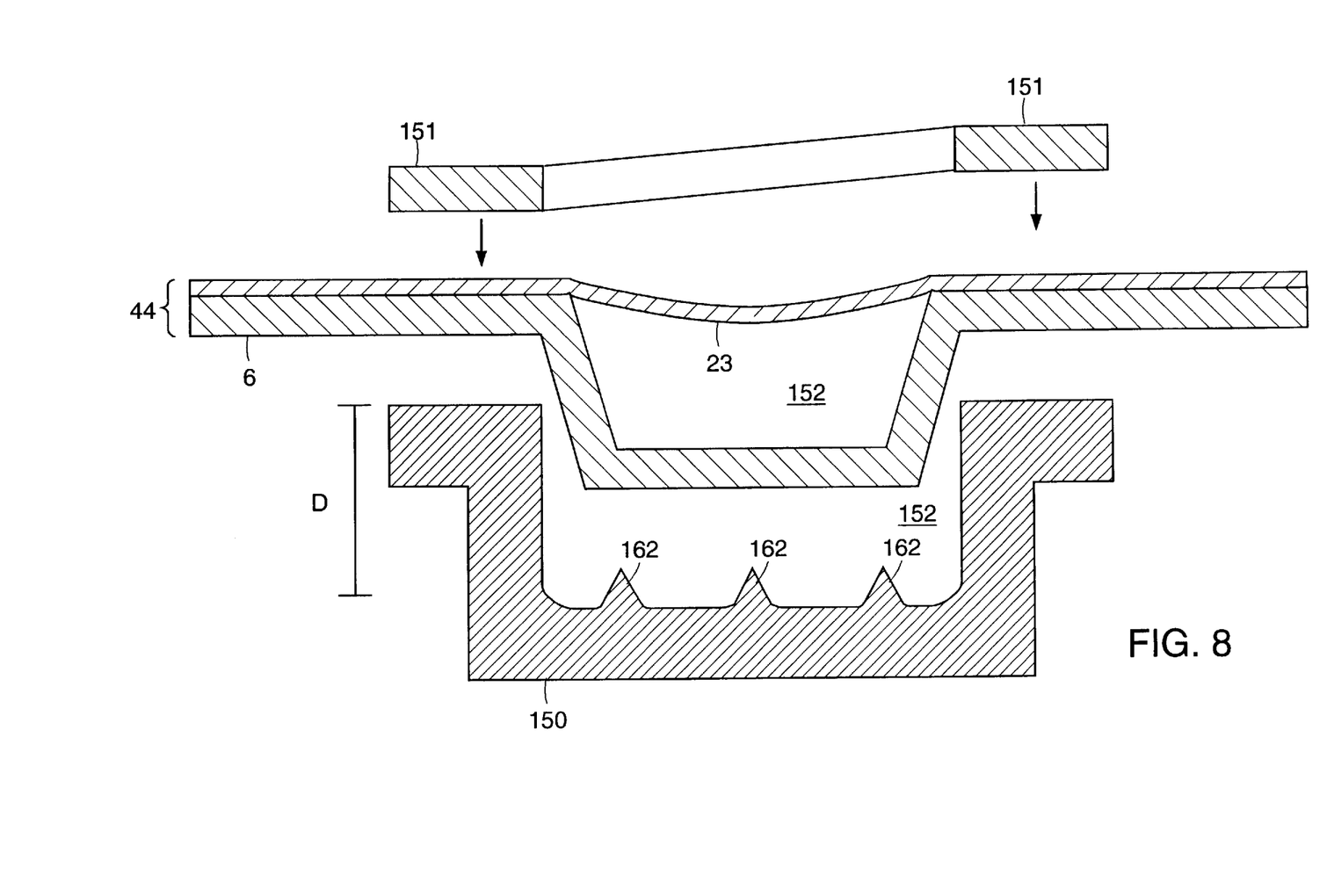
FIG. 8 is a cross-sectional view of a seat cushion shell and a mold.

Next, as shown in FIG. 8, cover material 6 of shell 44 (not shown to scale) is positioned over mold 150. the depth D of the mold 150 is slightly smaller than the width W of the front pattern 32 and the width of each side piece 34, 36 (FIG. 3). The barrier layer 23 is then placed over the cover material 6 and held in place by a perimeter clamp 151. The space 152 between the mold 150 and the barrier layer 23 is then evacuated to pull the barrier layer and the cover material 6 snugly against the mold 150. This forces the barrier layer and the cover material to conform to the contours 162 of the mold.

The cover material and the barrier are then heated with a heat source 100 (FIG. 1) moved by a robot 102 to bond the adhesive layers together, and form the finished composite material 5, ready for the foaming-in-place process. The heat source may be, for example, a hot air gun or an infrared heater. The adhesion of the barrier layer to the cover material is partly due to the physical penetration of the hot, molten adhesive layers into the foam layer 18.

The pinhole-free barrier layer 23 thus provides a seal allowing the shell to be vacuum drawn down onto the mold cavity and to conform exactly to its (possibly complex) surface.

Figure 9:
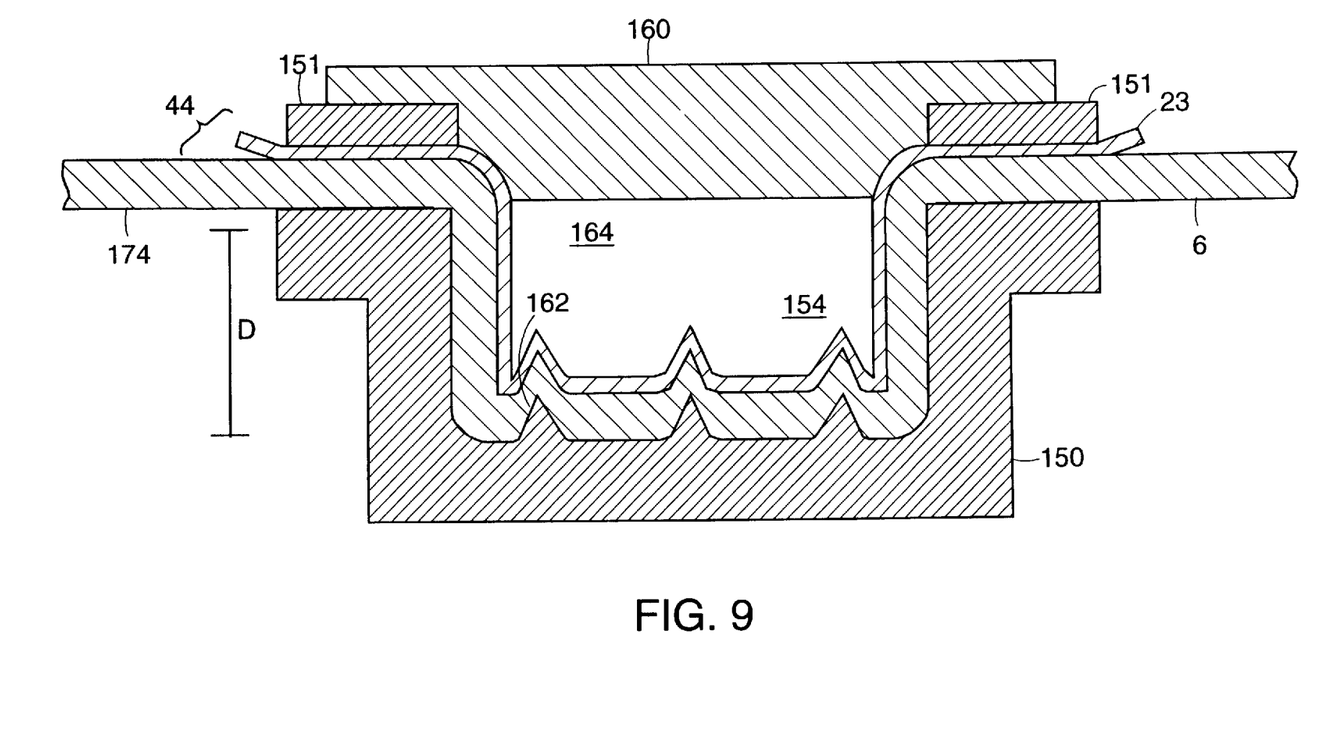
FIG. 9 is a cross-sectional view of the shell and mold of FIG. 8, with another mold, and foam between the molds.

Referring to FIG. 9, after the space between the mold and the barrier layer is evacuated, as shown, liquid reactive chemical foam constituents are poured into the mold cavity 154. A second mold 160 is placed over the main mold 150 and the clamp frame 151 to close the mold cavity, contain the chemical constituents in the mold cavity, and to regulate the final shape and density of the foam in the cavity. The chemical constituents then react to create a foam which increases in volume to fill cavity. The foam flows over and bonds inseparably to the barrier layer without damaging the foam. The foam then "sets" to form a urethane foam pad 164 having a surface detail corresponding to mold detail 162.

After the foam has set, the second mold 160 is removed and the clamp frame 151 loosened to allow the shell 44 and the attached foam pad 164 to be removed from the mold. Other components, e.g. plastic or metal parts not shown, may now be added to the foam pad.

Figure 10:
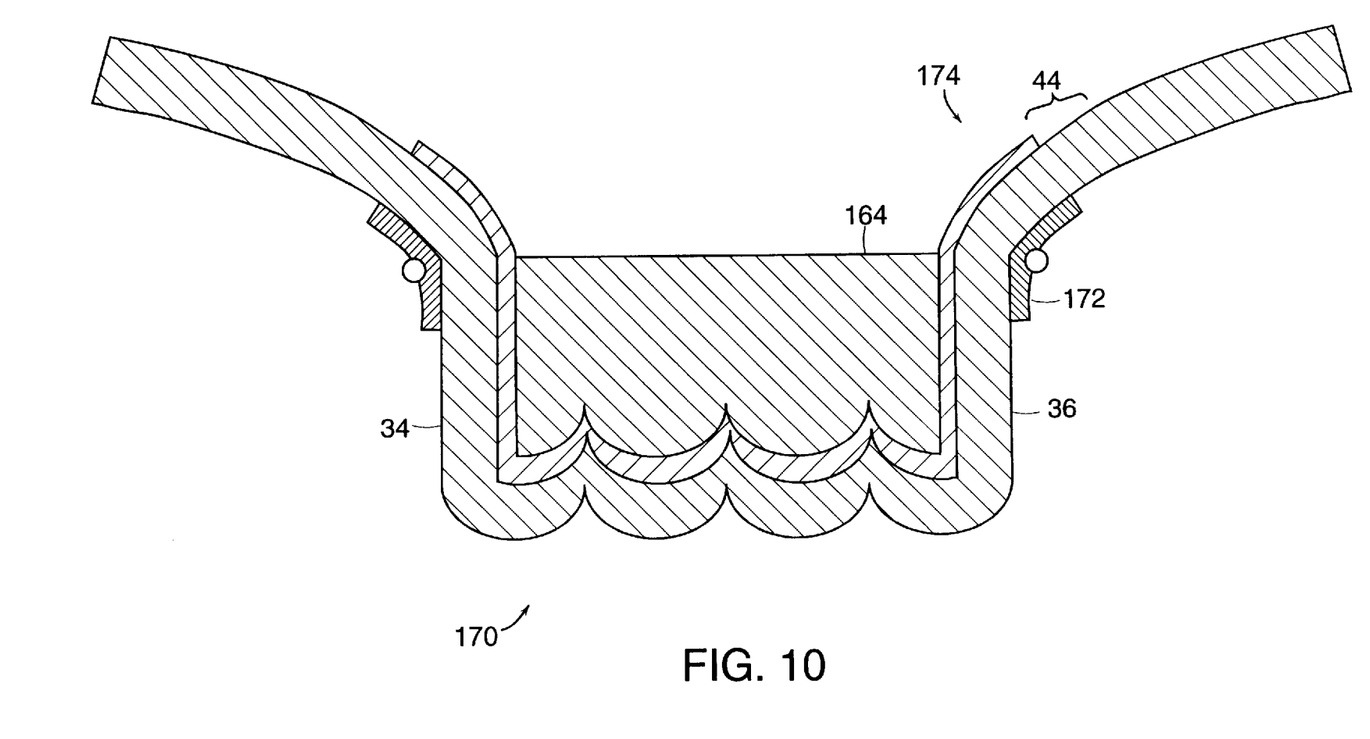
FIG. 10 is a cross-sectional view of a covered automobile seat cushion.

Referring to FIG. 10, the foam pad 164 and shell 44 removed from the mold provide a seat cushion 170 having an upholstery covering the foam pad 164. Detail work for the finished seat, such as vinyl reinforcement 172 at non-stitched end 174, may then be added. Alternatively, the final detail work and vinyl reinforcement may be done before the foaming process.

Figure 11:
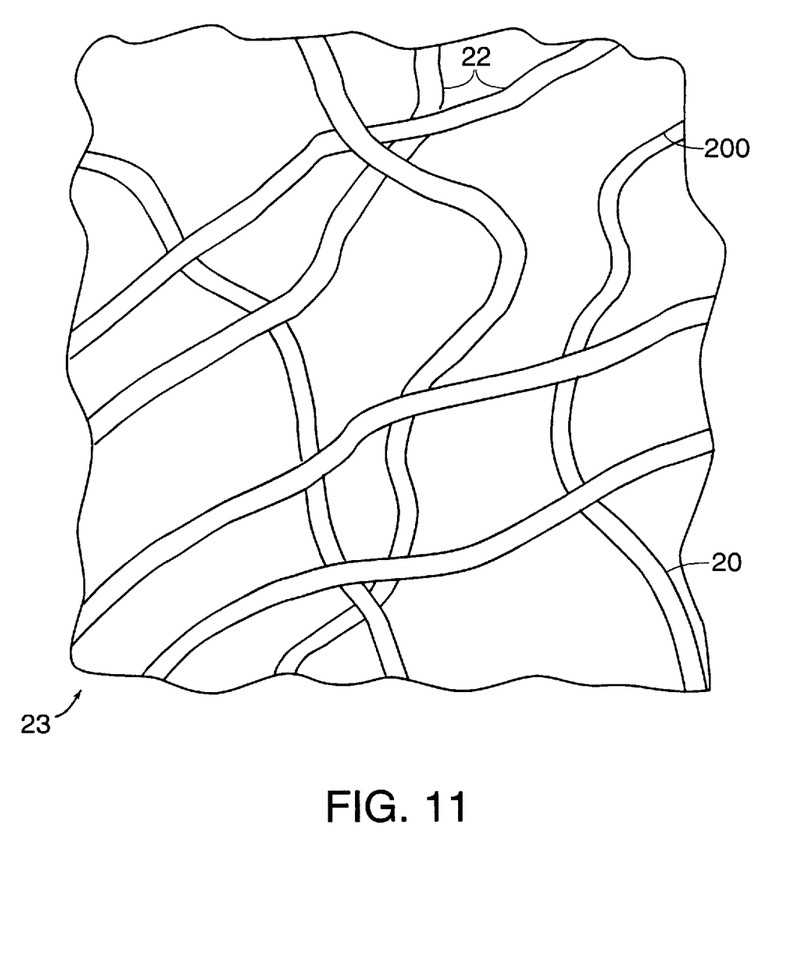
FIG. 11 is a magnified schematic top view of the barrier layer.

Referring to FIG. 11, urethane film 20 in barrier layer 23 is formed of urethane resin (e.g., a Vacuflex film available from Omniflex Limited Partnership in West Bridgewater, Mass., or BASF SP806, or other products within the same family of resins, or possibly resins supplied by other vendors), with a constant thickness T in the range of about 0.5 to 10 mils, preferably 1 to 3 mils, and most preferably about 2 mils. Because urethane film 20 faces the liquid agents which become the urethane foam pad, film 20 is pinhole-free, even when stretched slightly, and essentially lubricant-free in order to enhance bonding to the foam. Preferably, the film is completely lubricant-free, but it may have small amounts, e.g., less than an aggregate of 2% of impurities such as heat stabilizers or UV stabilizers or other processing additives. Other materials that could be used for the film include other urethanes, polyester, copolyesters, copolyamides, urethane and vinyl alloy, and urethane and thermoplastic rubber alloy, or other alloys containing urethane. Generically, the materials that would work best would have the properties of being elastic, thermoplastic, pin-hole free, able to adhere to the chemicals or substrates involved in the process, and durable and able to withstand whatever flexing takes place in the ultimate product.

The pre-formed adhesive layer 22 in the barrier layer may be a web of connected adhesive filaments 200, for example, a Spunfab PA 1700 available from Spunfab located in Akron, Ohio, or similar webs available from Bostik in Middletown, Mass. or Sharnet in Middletown, Del. The filaments of the web are criss-crossed in a random pattern and the web is open in the interstices between the filaments. The Spunfab PA 1700 adhesive is a plasticizer free copolyamide with a melting temperature range of 217 to 248 degrees Fahrenheit. Other webs, e.g. webs made of urethane, polyester, polyamide, or alloys of any of these materials with a melting temperature between 180 and 330 degrees Fahrenheit, with a preferred range between 200 to 250 degrees Fahrenheit, may also be used.

Figure 12:
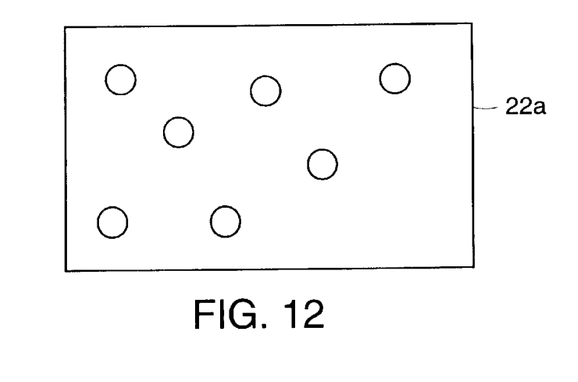
FIG. 12 is a schematic top view of a perforated adhesive layer.

Alternatively, the pre-formed, discontinuous adhesive layer may be provided by a perforated adhesive layer, shown in FIG. 12, such as is available from Xiro in Switzerland.

Figure 13:
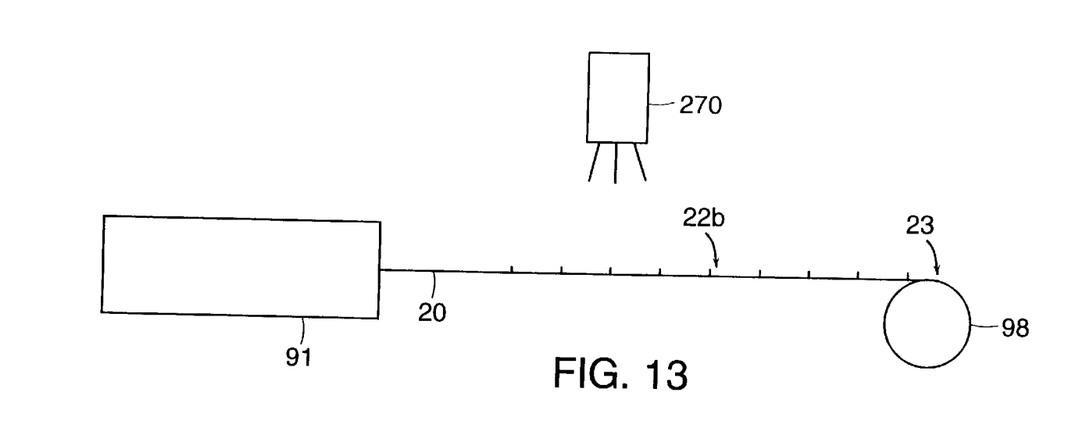
FIG. 13 is a pictorial representation of an adhesive spraying process for making a barrier layer by spraying a liquid adhesive or sputtering a molten adhesive from a hot melt applicator.

In addition, as seen in FIG. 13, a discontinuous adhesive layer 22b can be sprayed onto the urethane layer 20 with a sprayer (or hot melt applicator) 270 during extrusion of the urethane. The sprayer typically applies an adhesive in liquid form or an adhesive dissolved in a solvent in discrete drops to the urethane layer. The liquid adhesive is typically made of urethane or other materials.

When applied by a hot melt applicator 270, the adhesive (e g. urethane, polyamide, ester, or other material) is melted in the applicator before being "sprayed" or sputtered in a viscous form onto the urethane out of a nozzle in the applicator. This results in a more random coating of the urethane with regions of adhesive compared to the liquid sprayer. Hot melt applicators are available from Nordson in Norcross, Ga.

Figure 14:
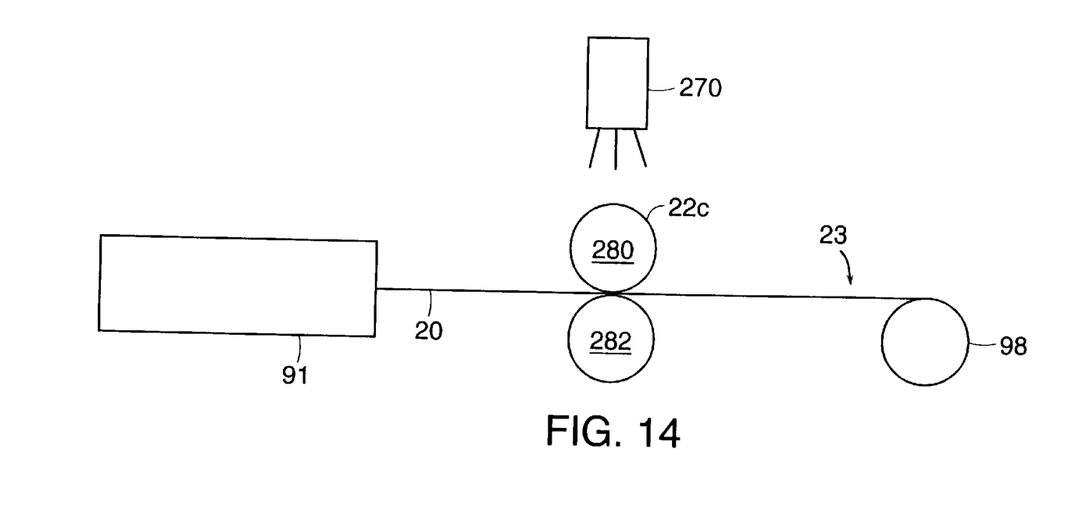
FIG. 14 is a pictorial representation of a printing process.

Similarly, as shown in FIG. 14, the discontinuous adhesive layer may be applied to the urethane by melting the adhesive in a hot melt applicator 270, described above, which then extrudes the viscous adhesive 22c onto a print roll 280 having a discontinuous surface pattern. The print roll impresses the extruded urethane with the adhesive according to its surface pattern as the urethane passes between the print roll and an opposite roll 282.

Figure 15:
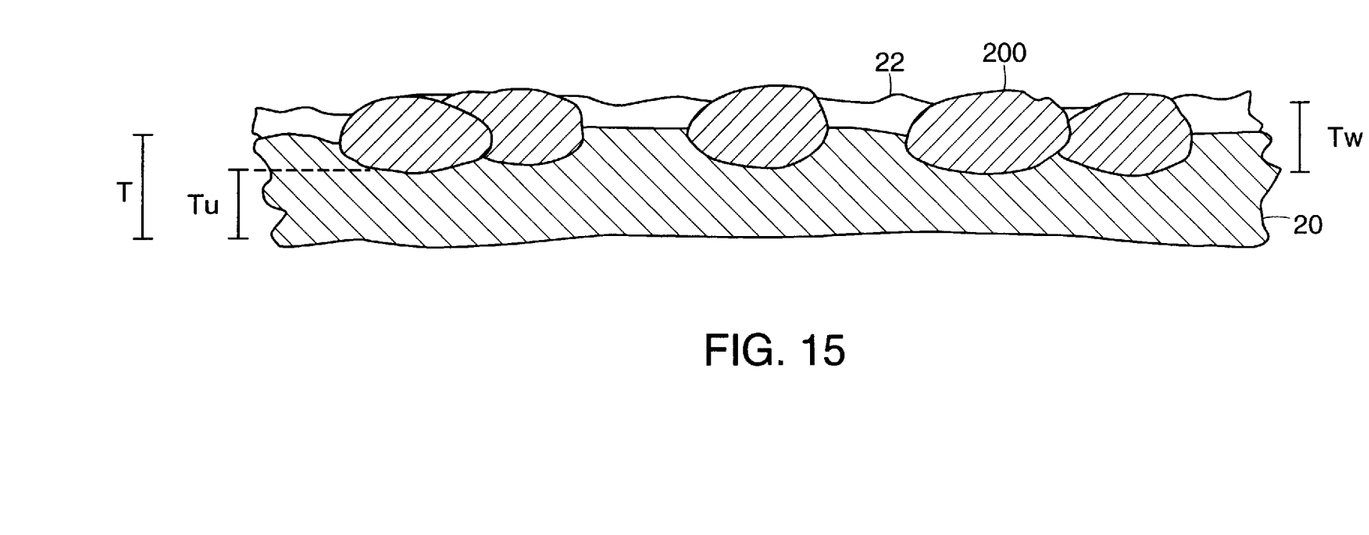
FIG. 15 is a magnified schematic side view of the barrier layer.

Referring to FIG. 15, the adhesive layer may be applied to the urethane layer using any of the above methods at a typical basis weight of 0.8 oz/yd$^2$ to 0.4 oz/yd$^2$, although other concentrations of adhesive can be applied. The thickness $T_W$ of the web layer may be between 0.002 inches to 0.020 inches, but is typically 0.007 inches. The resulting discontinuous adhesive layer on the urethane has a large exposed surface area to volume ratio and a small heat mass. The discontinuous adhesive layer provides a severalfold increase in the thickness of the layer over a continuous adhesive layer of identical weight. Thus, a smaller amount of adhesive can be used to obtain the same power of adhesion provided by the continuous layer. These features allow the adhesive to be rapidly and evenly melted when heated and also to bond in a stable manner to the cover material.

Laminating the adhesive to the urethane at the point of extrusion results in a penetration of the adhesive filaments 200 into the urethane layer. The embedded adhesive layer thus provides a hydrolitically stable bond, i.e. a bond that is not subject to failure when exposed to high humidity.

It is important that the adhesive not penetrate the urethane deeply enough to create pinholes in the urethane during vacuuming, and possibly stretching, of the barrier layer during the foam-in-place process. An unpenetrated urethane thickness $T_u$ of at least 0.0005 inches (typically 0.002 or 0.001 inches) is therefore maintained in the barrier layer to prevent pinholes from forming.

The adhesive layer 19 on the cover material 6 (FIG. 1) is provided by an identical or compatible discontinuous adhesive that bonds easily to the adhesive layer 22 on the barrier layer 23. A 0.4 oz/yd$^2$ Spunfab PA 1700 web is typically used for adhesive layer 19.

Other embodiments are within the scope of the following claims.

Figure 16:
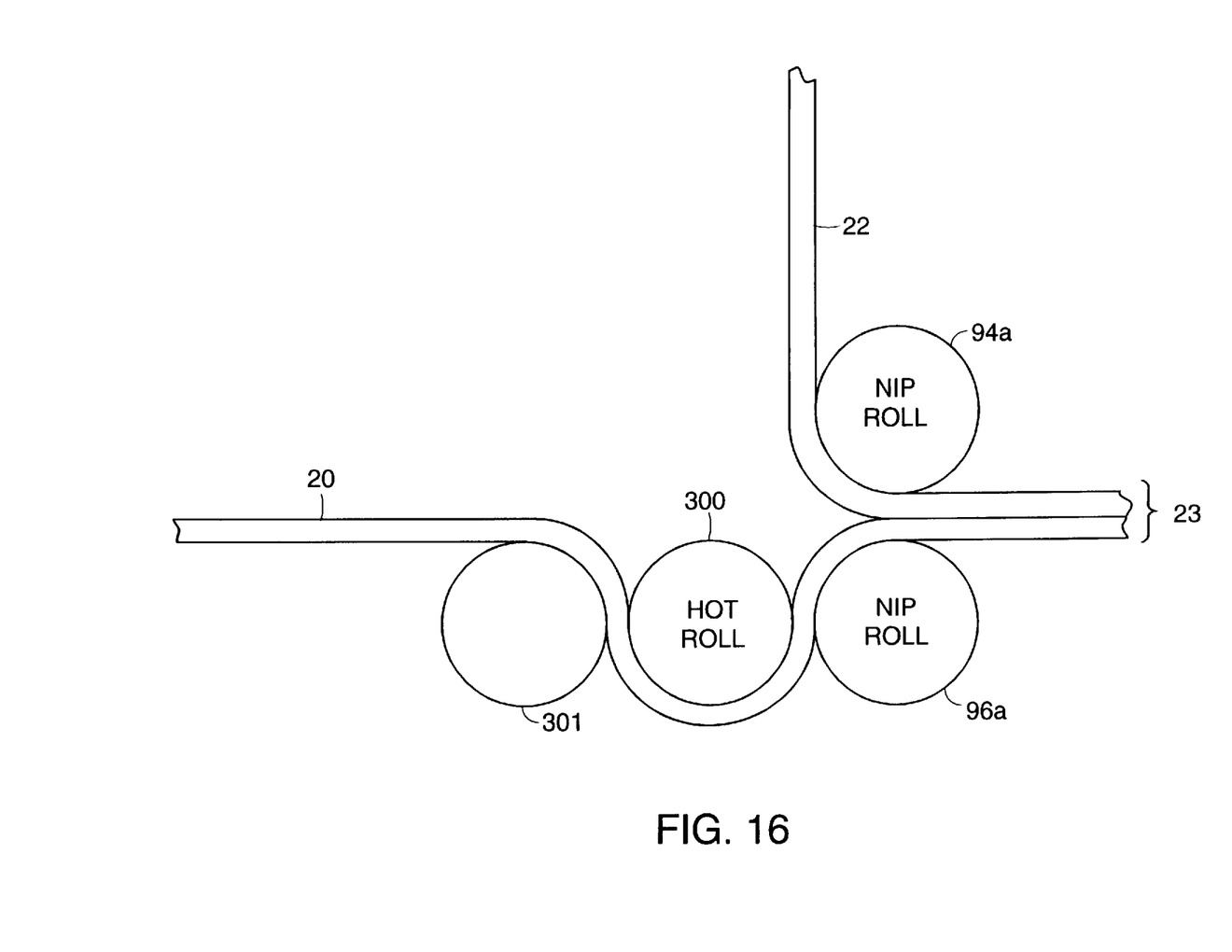
FIG. 16 is a pictorial representation of a casting process for making a barrier layer.

For example, referring to FIG. 16, the barrier layer 23 may be formed by first heating one side of a pre-existing urethane film 20 with a heated roll 300 before pressing a discontinuous, preformed adhesive layer 22 to the urethane film 20 with opposed nip rolls 94a, 96a. The urethane film 20 is pressed against the heated roll 300 by an opposed idler roll 301. The heated roll is warm enough to soften the urethane and allow penetration of the adhesive layer into the urethane film.

Figure 17:
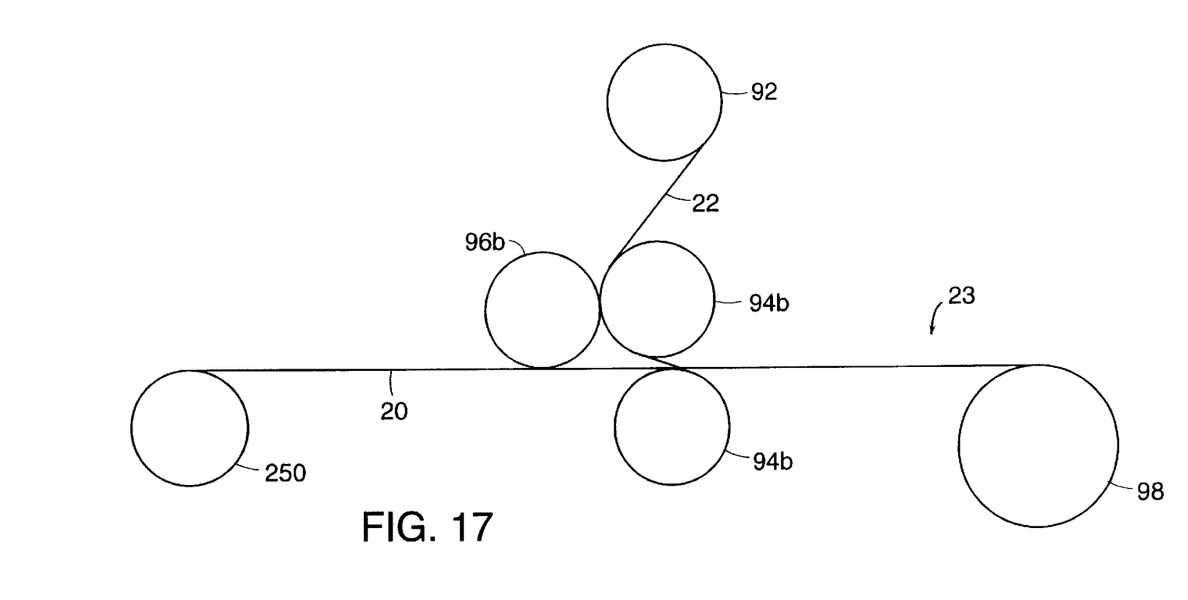
FIG. 17 is a pictorial representation of a printing process.

Alternatively, as seen in FIG. 17, a pre-extruded urethane film 20 from a roll 250 is first printed with an adhesive pattern by a print roll 96b and then pressed against a pre-existing discontinuous adhesive layer 22 by a pair of opposed nip rolls 94b. The adhesive pattern on the urethane film thus provides a bond between the urethane film 20 and the adhesive layer 22.

The cover material can also be assembled by heat calendaring or flame laminating the adhesive layer to the foam layer prior to flame laminating the fabric to the foam. Similarly, the adhesive can be laminated to the foam layer by heat calendaring and other methods after flame laminating the fabric to the foam. In addition, discrete adhesive layers can be initially applied to the foam layer by spraying, sputtering with a hot melt applicator or print rolling, as described above, in connection with FIGS. 13 and 14.

To further reduce the temperature at which the adhesive layer 19 on the cover material 6 (FIG. 1) and the second adhesive layer 22 on the barrier 23 adhere to one another, the adhesive layer on the barrier can be chosen to be an adhesive that chemically reacts with and easily bonds to the second adhesive layer.

What is claimed is:
1. A cushion sock for use in making foam-in-place products, the cushion sock comprising:
   a cover material defining a shape of the cushion sock; and
   a barrier layer covering an interior of the cushion sock, the barrier layer comprising a two-layer material including
   a thermoplastic film having a thickness between about 0.5 mils and about 10 mils, the thermoplastic film being sufficiently air tight to permit the thermoplastic film to serve as a vacuum barrier; and a discontinuous adhesive layer attached to the thermoplastic film, the discontinuous adhesive layer securing the thermoplastic film to the cover material.

2. The cushion sock of claim 1 wherein the adhesive layer comprises disconnected regions of adhesive.

3. The cushion sock of claim 2 wherein the disconnected regions are randomly distributed on the thermoplastic film.

4. The cushion sock of claim 2 wherein the disconnected regions are distributed in a pattern on the thermoplastic film.

5. The cushion sock of claim 1 wherein the proportion of the surface area of the thermoplastic film to which the adhesive layer is attached is no more than 90%.

6. The cushion sock of claim 1 wherein the adhesive layer comprises a web of filaments.

7. The cushion sock of claim 1 wherein the adhesive layer comprises a perforated layer of adhesive.

8. The cushion sock of claim 1 wherein the adhesive layer is at least partially embedded in the thermoplastic film.

9. The cushion sock of claim 8 wherein the thermoplastic film comprises an unpenetrated thickness of at least 0.0005 inches which is unpenetrated by the adhesive layer.

10. The cushion sock of claim 1 wherein the adhesive layer comprises a copolyamide.

11. The cushion sock of claim 1 wherein the adhesive layer has a melting temperature between 180 and 300 degrees Fahrenheit.

12. The cushion sock of claim 1 wherein the adhesive layer has a surface texture that is non-tacky.

13. The cushion sock of claim 1 wherein the thermoplastic film comprises urethane.

14. The cushion sock of claim 1, wherein the two-layer includes only a single discontinuous adhesive layer attached to the thermoplastic film.

15. The cushion sock of claim 1, wherein the discontinuous adhesive layer has a melting temperature higher than 180 degrees Fahrenheit.

16. The cushion sock of claim 1, wherein prior to attachment of the barrier layer, the cover material has an exposed non-tacky, discontinuous adhesive layer bonded to a surface of the cover material.

17. The cushion sock of claim 16, wherein:

the cover cushion sock comprises two discrete patterns, the two discrete patterns are joined together along edges of the patterns with the adhesive layer of the cover material exposed, and the barrier layer is secured to the cover material with the adhesive layers between the barrier layer and the cover material.

18. The cushion sock of claim 17 wherein the patterns comprise different fabrics.

19. The cushion sock of claim 16 wherein the adhesive layer of the cover material comprises a web of adhesive filaments.

20. The cushion sock of claim 16 wherein the cover material comprises a foam layer attached to a fabric layer, the adhesive layer of the cover material being bonded to a surface of the foam layer.

* * * * *